United States Patent [19]
Keba et al.

[11] Patent Number: 5,652,783
[45] Date of Patent: Jul. 29, 1997

[54] METHOD AND APPARATUS FOR SELECTIVELY ENCODING DIGITAL MESSAGES IN A COMMUNICATION SYSTEM

[75] Inventors: James Michael Keba, Wellington; Arthur Herkert, Lantana; Kenneth D. Finlon, Wellington, all of Fla.

[73] Assignee: Motorola, Inc., Schaumburg, Ill.

[21] Appl. No.: 496,563

[22] Filed: Jun. 29, 1995

[51] Int. Cl.⁶ .................................................. H04Q 7/08
[52] U.S. Cl. .................. 370/313; 340/825.03; 455/31.2; 455/466; 455/38.1
[58] Field of Search ................................ 379/57; 381/41; 340/815.03; 380/9; 370/29

[56] References Cited

U.S. PATENT DOCUMENTS

| | | | |
|---|---|---|---|
| 5,117,460 | 5/1992 | Berry et al. | 381/41 |
| 5,146,214 | 9/1992 | Yamada et al. | 340/825.03 |
| 5,412,719 | 5/1995 | Hamamoto et al. | 380/9 |
| 5,517,491 | 5/1996 | Nanni et al. | 370/29 |

*Primary Examiner*—William Cumming
*Attorney, Agent, or Firm*—Philip P. Macnak

[57] ABSTRACT

A communication system providing selective encoding of digital messages (408) comprising a plurality of transmitting devices (116) and a plurality of receiving devices (122). The transmitting devices (116) transmit an encoded address (404), encoded message vector (406) in a first portion of the message, and digital message (408) in a second portion of the message. The digital message (408) is encoded in the second portion of the message with an error correction code if the digital message is a data message (414), and without the overhead of an error correction code if the digital message (408) is a voice message (410). The receiving device (122) decodes the encoded address (404), encoded message vector (406), and digital message (408) transmitted by the transmitting devices (116) in the first and second portion of the message. The receiving device (122) determines the encoding method of the digital message (408) based on the message type received in the message vector (406), and thereafter decodes the digital message.

19 Claims, 9 Drawing Sheets

METHOD AND APPARATUS FOR SELECTIVELY ENCODING DIGITAL MESSAGES IN A COMMUNICATION SYSTEM

FIELD OF THE INVENTION

This invention relates in general to communication systems, and more specifically to a method and apparatus for selectively encoding digital messages for transmission in a communication system.

BACKGROUND OF THE INVENTION

In the past, paging devices were restricted to short voice and data messages due to communication system bandwidth restrictions and paging device technology limitations. Technology improvements in circuit integration and digital voice and data compression algorithms have expanded the capability of messaging systems. Digital voice compression algorithms limit the amount of information transmitted to a receiving device, thus, providing a more efficient use of the communication system bandwidth. Although bandwidth utilization has been improved by digital voice compression algorithms, these algorithms have raised the performance and circuit requirements of the processing units used by the receiving devices.

Today's paging protocols use sophisticated error correction codes to improve the reliability of data message transmissions. With error correcting codes, a corrupt message can be reconstructed as long as the bit errors do not surpass the capabilities of the error correcting code. For one-way communication systems, where re-transmission requests of corrupt messages is not possible, error correcting codes provide a necessary mechanism for improving the reliability of message delivery.

Digital voice and data compression algorithms include in many instances the use of error correcting codes in the compressed message. In cases such as these, sending a compressed digital voice message which already includes a first level of error correction in a protocol which adds the overhead of a second level of error correction results in an inefficient use of the communication bandwidth.

Thus, what is needed is a method and apparatus for selectively encoding voice and data messages transmitted to receiving devices.

SUMMARY OF THE INVENTION

One aspect of the present invention is a communication system comprising one or more transmitting devices and one or more receiving devices, a method for selectively encoding a message, the method comprising the steps of, in the one or more transmitting devices, determining a message type for a digital message to be delivered to the one or more receiving devices, encoding in a first portion of the message a selective call address corresponding to the one or more receiving devices, encoding in a second portion of the message the digital message corresponding to the one or more receiving devices, and transmitting in the first portion of the message the selective call address and thereafter transmitting in the second portion of the message the digital message. In addition the method comprises the steps of, in the one or more receiving devices, receiving the message transmitted by the one or more transmitting devices comprising in the first portion of the message the selective call address and in the second portion of the message the digital message, decoding the selective call address encoded in the first portion of the message to determine when there is a match with a predetermined address assigned to the one or more receiving devices, and thereafter decoding the digital message in the second portion of the message based on the message type which defines an encoding method used to encode the digital message.

Another aspect of the present invention is a communication system comprising one or more transmitting devices and one or more receiving devices for selectively encoding a message, the communication system comprising in the one or more transmitting devices, comprising a processor for directing operation of the one or more transmitting devices, a message interface coupled to the processor for receiving a digital message to be delivered to the one or more receiving devices, a determining element for determining a message type for the digital message, an address encoding element for encoding in a first portion of the message a selective call address corresponding to the one or more receiving devices, a message encoding element for encoding in a second portion of the message the digital message corresponding to the one or more receiving devices, and a transmitter interface coupled to the processor for controlling a transmitter to transmit in the first portion of the message the selective call address and thereafter transmitting in the second portion of the message the digital message. The communication system further comprising in the one or more receiving devices, comprising a microprocessor for directing operation of the one or more receiving devices, a receiver for receiving the message transmitted by the one or more transmitting devices comprising in the first portion of the message the selective call address and in the second portion of the message the digital message, an address decoding element for decoding the selective call address encoded in the first portion of the message to determine when there is a match with a predetermined address assigned to the one or more receiving devices, and a message decoding element for decoding the digital message in the second portion of the message based on the message type which defines an encoding method used to encode the digital message.

Still another aspect of the present invention is a communication system comprising one or more transmitting devices and one or more receiving devices for selectively encoding a message, the communication system comprising in the one or more transmitting devices, comprising a processor for directing operations of the one or more transmitting devices, a message interface coupled to the processor for receiving a digital message to be delivered to the one or more receiving devices, a determining element for determining a message type for the digital message, an address encoder for encoding in a first portion of the message a selective call address corresponding to the one or more receiving devices, a message encoder for encoding in a second portion of the message the digital message corresponding to the one or more receiving devices, and a transmitter interface coupled to the processor for controlling a transmitter to transmit in the first portion of the message the selective call address and thereafter transmitting in the second portion of the message the digital message. The communication system further comprising in the one or more receiving devices, comprising a microprocessor for directing operation of the one or more receiving devices, a receiver for receiving the message transmitted by the one or more transmitting devices comprising in the first portion of the message the selective call address and in the second portion of the message the digital message, an address decoder for decoding the selective call address encoded in the first portion of the message to determine when there is a match with a predetermined address assigned to the one or more receiving devices, and a message decoder for decoding the digital message in the second portion of the message based on the message type which defines an encoding method used to encode the digital message.

DESCRIPTION OF THE PREFERRED EMBODIMENT

Figure 1:
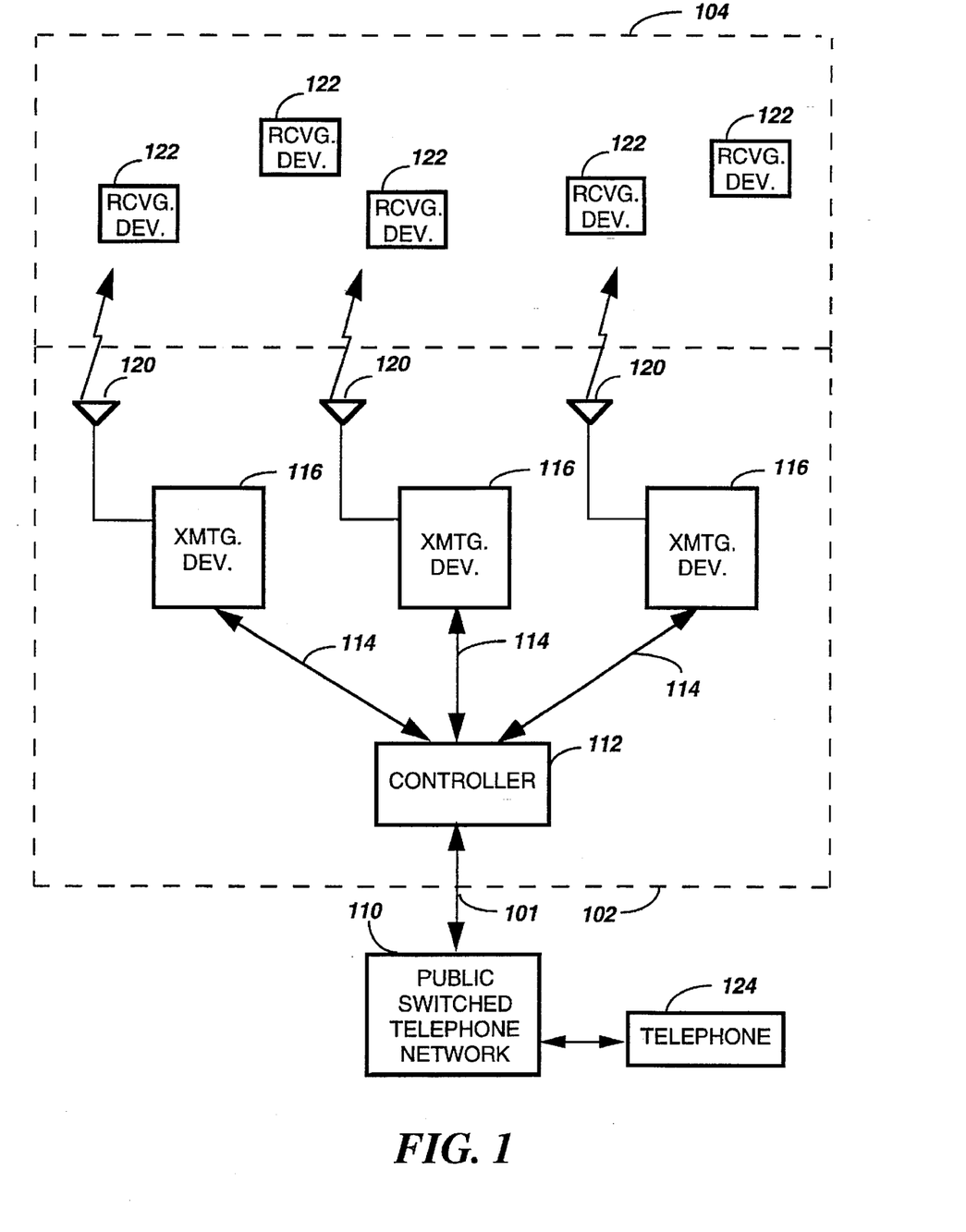
FIG. 1 is an electrical block diagram of a communication system in accordance with the preferred embodiment of the present invention.

Referring to FIG. 1, an electrical block diagram of a communication system in accordance with the preferred embodiment of the present invention comprises a first portion 102 and a second portion 104. The first portion 102 includes a plurality of transmitting devices 116, for communicating with the second portion 104, utilizing conventional transmission techniques well known in the art, and coupled by communication links 114 to a controller 112 which controls the transmitting devices 116. The hardware of the controller 112 is preferably a combination of the Wireless Messaging Gateway (WMG™) Administrator! paging terminal and the RF-Conductor!™ message distributor manufactured by Motorola, Inc. The hardware of the transmitting devices 116 is preferably a Nucleus® Orchestra! transmitter manufactured by Motorola, Inc. It will be appreciated that other similar hardware can be utilized for the controller 112 and transmitting devices 116.

Each of the transmitting devices 116 transmits radio signals to the second portion 104 comprising a plurality of receiving devices 122 via a transmitting antenna 120. The radio signals comprise selective call addresses and message transactions between the transmitting devices 116 and the receiving devices 122. The controller 112 preferably is coupled by conventional telephone links 101 to a public switched telephone network (PSTN) 110 for receiving selective call messages therefrom. The selective call messages comprise voice and data messages received from the PSTN 110 using, for example, a conventional telephone 124 coupled to the PSTN 110 in a manner well known in the art.

Data and control transmissions between the transmitting devices 116 and the receiving devices 122 preferably utilize a protocol such as Motorola FLEX™ digital selective call signaling protocol. This protocol utilizes well-known error detection and error correction techniques and is therefore tolerant to bit errors occurring during transmission, provided that the bit errors are not too numerous in any one code word.

Transmissions comprising data and control signals from the transmitting devices 116 preferably utilize two and four-level frequency shift keyed (FSK) modulation, operating by way of example at sixteen-hundred or thirty-two-hundred symbols-per-second (sps), depending on traffic requirements and system transmission gain. It will be appreciated that other signaling protocols, modulation schemes, and transmission rates can be utilized as well.

Figure 2:
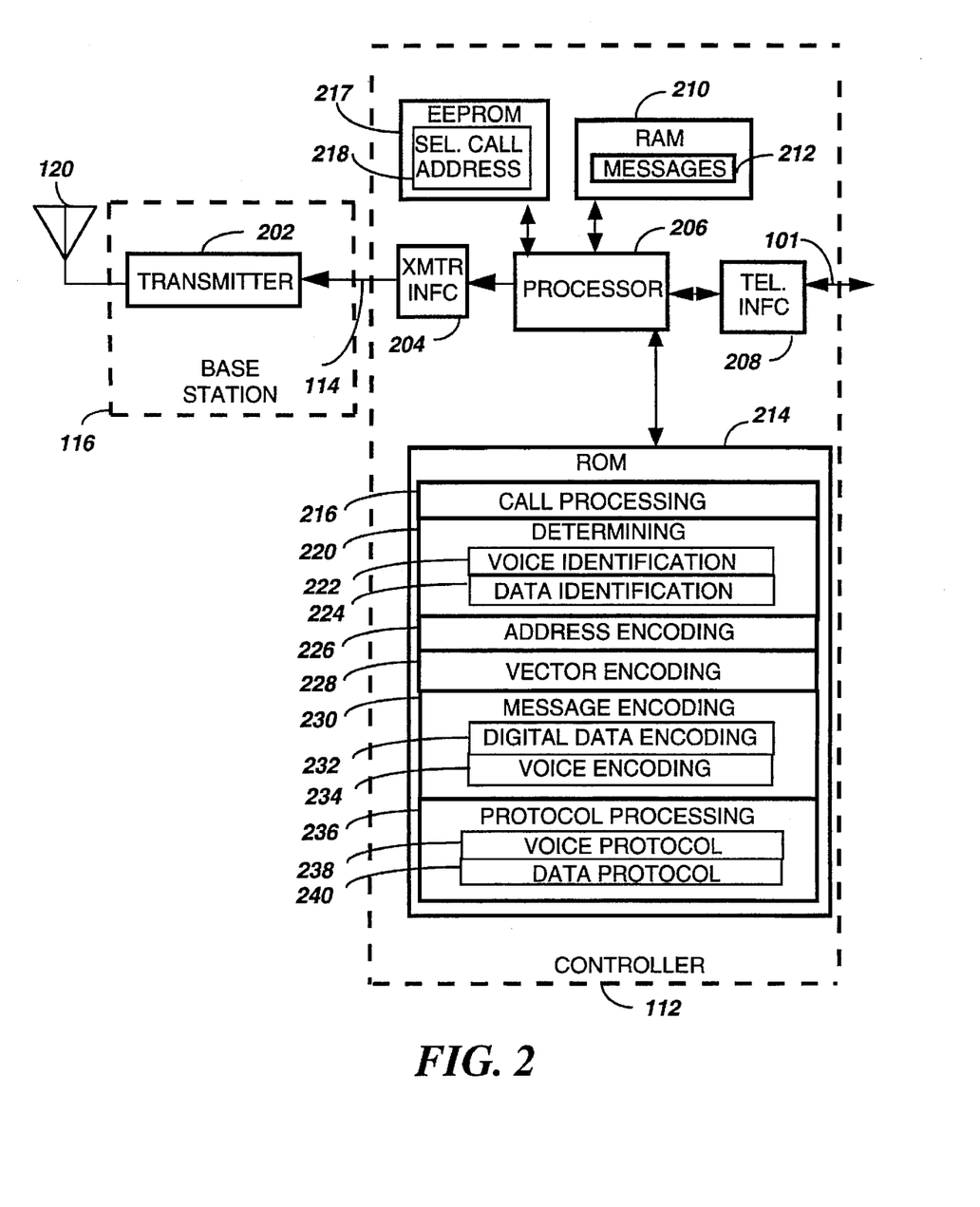
FIGS. 2 and 3 are first and second embodiments of an electrical block diagram of elements of a controller and a transmitting device utilized in the communication system of FIG. 1.

FIG. 2 is a first embodiment of an electrical block diagram of elements of a controller 112 and a transmitting device 116 utilized in the communication system of FIG. 1. The controller 112 comprises a processor 206 for directing operation of the controller 112. The processor 206 preferably is coupled through a transmitter interface 204 to a transmitter 202 via communication links 114. The transmitter 202 transmits two and four-level FSK data messages to the receiving devices 122. The communication links 114 coupled between the transmitting devices 116 and the controller 112 use communication techniques, such as a direct wire line (telephone) link, a data communication link, or any number of radio frequency links, such as a radio frequency (RF) transceiver link, a microwave transceiver link, or a satellite link, just to mention a few.

The processor 206 is also coupled to a telephone interface 208 for communicating with the telephone system, and in particular with the PSTN 110 through telephone links 101. The telephone interface 208 performs the function of a message interface for receiving messages. The processor 206 is also coupled to a random access memory (RAM) 210 comprising locations 212 for storing messages destined for receiving devices 122 and to a ROM 214 which includes firmware elements for use by the processor 206. The messages stored in the RAM 210 include digital voice and data messages. It will be appreciated that, alternatively, other message interfaces can be used for receiving messages such as the well known Personal Computer Memory Card International Association (PCMCIA) interface. With a PCMCIA interface the processor 206 can receive selective call originations from any number of compatible PCMCIA devices such as, for example, a computer performing a file transfer into the RAM 210 of the processor 206.

It will be further appreciated that other types of memory, e.g., electrically erasable programmable ROM (EEPROM) or magnetic disk memory, can be utilized for the ROM 214, as well as the RAM 210. It will be further appreciated that the RAM 210 and the ROM 214, singly or in combination, can be integrated as a contiguous portion of the processor 206. Preferably, the processor 206 is similar to the DSP56100 digital signal processor (DSP) manufactured by Motorola, Inc. It will be appreciated that other similar processors can be utilized for the processor 206, and that additional processors of the same or alternate type can be added as required to handle the processing requirements of the controller 112.

The firmware elements comprise a call processing element 216, a determining element 220, an address encoding element 226, a vector encoding element 228, a message encoding element 230, and a protocol processing element 236. In operation the processor 206 invokes the call processing element 216, which handles the processing of an incoming call for a called party and controls the transmitter 202 of the transmitting device 116 to send a message comprising digital message information to the receiving device 122 corresponding to the called party. During message processing, the call processing element 216 calls on the processor 206 to invoke the determining element 220 to determine a message type for the digital message to be delivered to the receiving device 122. To determine the message type of the digital message, the processor 206 calls on either a voice identification element 222 or a data identification element 224. When the digital message is a digital voice message, the processor 206 accesses the voice identification element 222 and in response generates a first message type identifying the digital message as a digital voice message. Similarly, when the digital message is a digital data message, the processor 206 accesses the data identification element 224 and in response generates a second message type identifying the digital message as a digital data message. Once the message type for the digital message has been determined, the processor 206 invokes the address encoding element 226 for encoding in a first portion of the message a selective call address 218 stored in an electrically erasable programmable read only memory (EEPROM) 217 corresponding to the receiving device 122 which the message is to be delivered. The selective call address 218 is preferably encoded using an error correction code which corrects for transmission errors. The error correction code is preferably the well known Bose, Chaudhuri, Hocquernghem (BCH) error correction code. Following the encoding of the selective call address 218, the processor 206 invokes the vector encoding element 228 for adding a message vector to the first portion of the message. The message vector specifies a location of the digital message to be transmitted in the second portion of the message. Moreover, a portion of the message vector includes the message type which identifies the encoding method utilized for encoding the digital message. The message vector is also preferably encoded with BCH code. The message type is used by the receiving device 122 to determine the decoding method to be used on the digital message, as will be described below. Once the selective call address 218 and message vector have been encoded in the first portion of the message, the processor 206 calls on the message encoding element 230 to selectively encode the message destined for the receiving device 122. To determine the message encoding scheme, the processor 206 invokes either the digital data encoding element 232 or the voice encoding element 234. When the message type identifies the digital message as a digital data message as described above, the processor 206 invokes the digital data encoding element 232 to encode in the second portion of the message the digital message as a digital data message with preferably the BCH error correcting code (ECC). In contrast, when the message type identifies the digital message as a digital voice message as described above, the processor 206 accesses the voice encoding element 234 to encode in the second portion of the message the digital message as a digital voice message without any additional error correcting or detection code added to the digital voice message. For both digital voice and digital data messages a message header encoded with BCH ECC is added to the second message portion. The header provides control information identifying, for example, the number of message fragments being transmitted, and whether more message fragments are expected in following frames. Note for digital voice messages the message remains un-encoded. After construction of the first and second portion of the message, the processor 206 invokes the protocol processing element 236, which sends the message in one of two formats to the transmitting device's 116 transmitter 202 based on the message type of the digital message. The protocol processing element 236 comprises a voice protocol element 238 and a data protocol element 240. The voice protocol element 238 is used by the processor 206 for generating a contiguous sequence of digital symbols for the digital voice message. The contiguous sequence of digital symbols generated by the voice protocol element 238 in the second portion of the message is of variable bit length. The data protocol element 240 is used by the processor 206 for generating a sequence of packets for the digital data message. Each packet generated by the data protocol element 240 is of predetermined bit length and is encoded with BCH ECC. It will be appreciated that, alternatively, other error detection and/or correction codes can be utilized such as Hamming codes for encoding the selective call address 218, message vector and digital message comprising a digital data message.

In an alternate embodiment of the present invention, the first portion of the message comprises only a selective call address 218 without a message vector to locate the digital message in the second portion of the message. For this case, the first and second portion of the message is preferably contiguous. In addition, a portion of the selective call address 218 includes the message type of the digital message transmitted in the second portion of the message.

Figure 3:
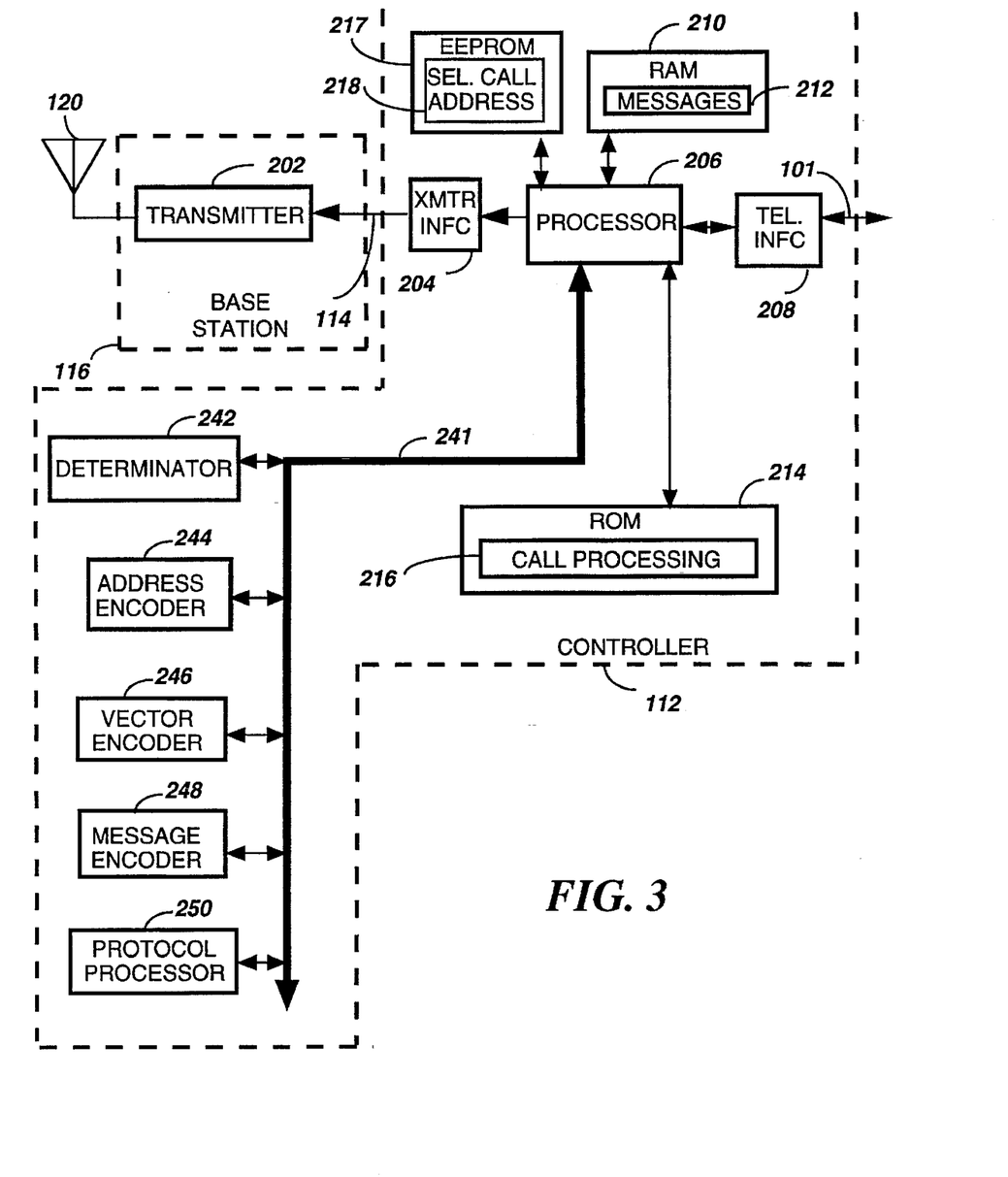

Referring to FIG. 3, a second embodiment of an electrical block diagram of portions of the controller 112 and the transmitting devices 116. The elements of FIG. 3 include the same elements of FIG. 2 with the exception of the firmware elements, which include the determining element 220, the address encoding element 226, the vector encoding element 228, the message encoding element 230, and the protocol processing element 236. These elements are replaced with functionally equivalent hardware elements which utilizing conventional logic design techniques well known in the art. The hardware elements comprise a determinator 242, an address encoder 244, a vector encoder 246, a message encoder 248 and a protocol processor 250. The hardware elements are coupled to the processor 206 by a data transfer bus 241. The data transfer bus 241 is preferably a conventional bus, as understood well by one of ordinary skill in the art, comprising an address portion, data portion and control portion which allows for bi-directional message transactions to occur between the processor 206 and the hardware elements. For a description of the hardware elements, refer to the firmware descriptions given above in FIG. 2.

Figure 4:
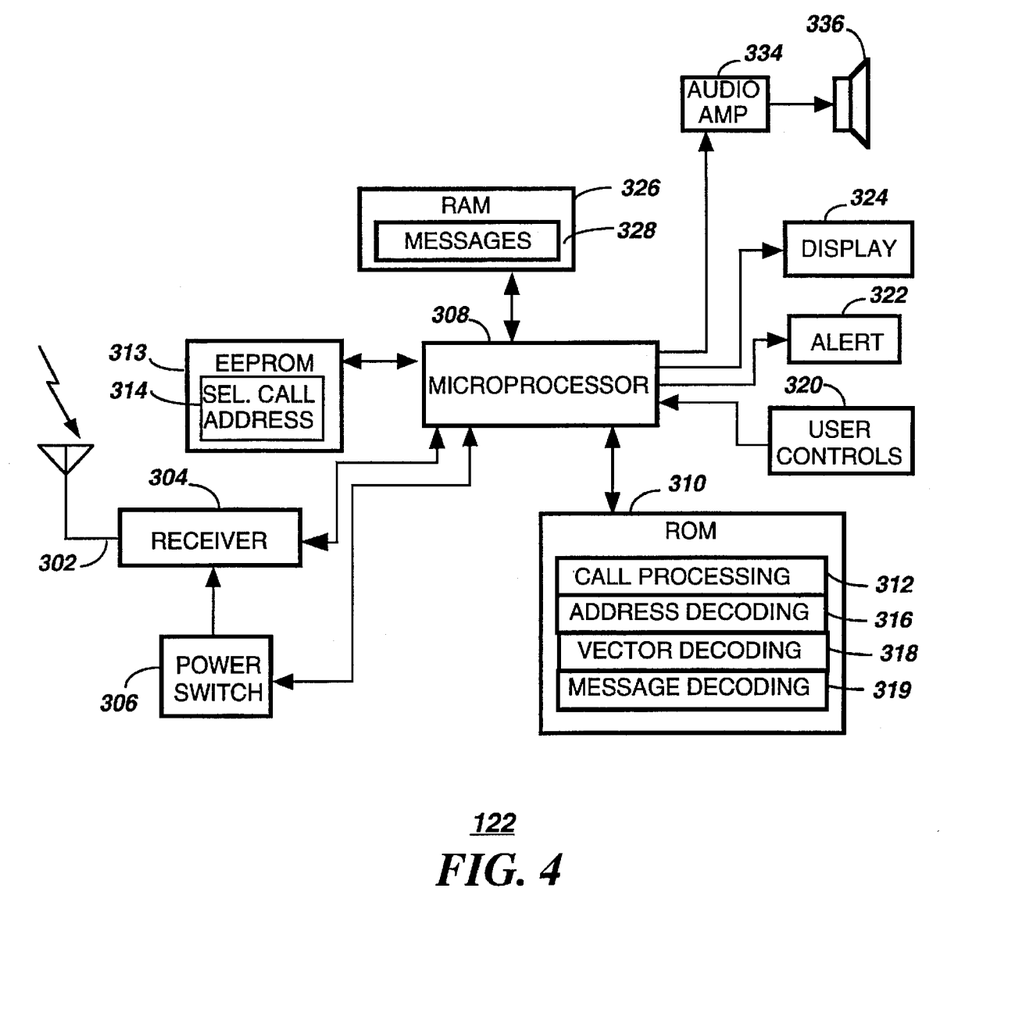
FIGS. 4 and 5 are first and second embodiments of an electrical block diagram of a receiving device utilized in the communication system of FIG. 1.

Referring to FIG. 4, an electrical block diagram of a first embodiment of the receiving device 122 in accordance with the present invention comprises a receiver antenna 302 for intercepting radio signals from the transmitting devices 116. The receiver antenna 302 is coupled to a receiver 304 utilizing conventional techniques well known in the art. The radio signals received from the transmitting devices 116 use conventional two and four-level FSK. Radio signals received by the receiver 304 produce demodulated information at the output. The demodulated information is coupled to the input of a microprocessor 308, which processes the information received from the transmitting device 116.

A conventional power switch 306, coupled to the microprocessor 308, is used to control the supply of power to the receiver 304, thereby providing a battery saving function. The microprocessor 308 is coupled to a RAM 326 for storing messages 328 in message storage locations. The microprocessor 308 also is coupled to a ROM 310 comprising a call processing element 312, an address decoding element 316, a vector decoding element 318 and a message decoding element 319. The call processing element 312 handles the processing of incoming messages from the transmitting devices 116. When a message is received, the call processing element 312 calls on the address decoding element 316 to decode a selective call address 314 encoded in the first portion of the message, and to determine when there is a match with a predetermined address assigned to the receiving device 122. The address decoding element 316 first checks for errors in the selective call address 314 and corrects the errors utilizing BCH ECC included with the selective call address 314. Once the selective call address 314 has been decoded, the microprocessor 308 compares one or more selective call addresses 314 stored in an EEPROM 313, and when a match is detected, the microprocessor 308 invokes the vector decoding element 318 to process the message vector received also in the first portion of the message. The vector decoding element 318 performs the same error detection and correction on the message vector as performed for the selective call address 314. Once detected errors have been corrected for the message vector, the vector decoding element 318 decodes the message vector to determine the message type of the digital message and the position of the digital message in the second portion of the message. After the vector decoding element 318 decodes the message vector, the microprocessor 308 delivers the digital message position and message type to the message decoding element 319 which proceeds to decode the digital message in the second portion of the message. The message decoding element 319 first removes the message header transmitted with the digital message. When the message decoding element 319 identifies the message type of the digital message as a digital voice message without error correction coding, then the microprocessor 308 stores the message directly in the RAM 326 without further processing. When the message decoding element 319 identifies the message type of the digital message as a digital data message with error correction coding, then the microprocessor 308 checks the message for transmission errors, corrects for errors detected, removes the error correction code from the message, and then stores the message in the RAM 326. Once the message has been stored in the RAM 326, a call alerting signal is generated to alert a user that a message has been received. The call alerting signal is directed to a conventional audible or tactile alerting device 322 for generating an audible or tactile call alerting signal. The message 328 can be accessed by the user through user controls 320, which provide functions such as lock, unlock, delete, read, etc. More specifically, by the use of appropriate functions provided by the user controls 320, the message 328 is recovered from the RAM 326, and then displayed on a display 324, e.g., a conventional liquid crystal display (LCD) when the message 328 is an alpha-numeric or numeric only message. For voice messages, however, the voice message is played out by the combination of an audio amplifier 334 and a speaker 336 using conventional techniques well known in the art.

In an alternate embodiment of the present invention, the first portion of the message comprises only the selective call address 314 without a message vector as described above. In this case, the first and second portion of the message are preferably contiguous. In addition, a portion of the selective call address 218 includes the message type of the digital message transmitted in the second portion of the message. In this case, the receiving device 122 utilizes the same firmware elements except for the vector decoding element 318. Moreover, the address decoding element 316 further decodes a portion of the selective call address 314 to determine the message type which defines the encoding method used by the transmitting device 116 in transmitting the digital message. Once the message type has been determined and a match has been detected with the selective call address 314 stored in the EEPROM 313, the message decoding element 319 is invoked by the microprocessor 308.

The function of the message decoding element 319 is the same as described above.

Figure 5:
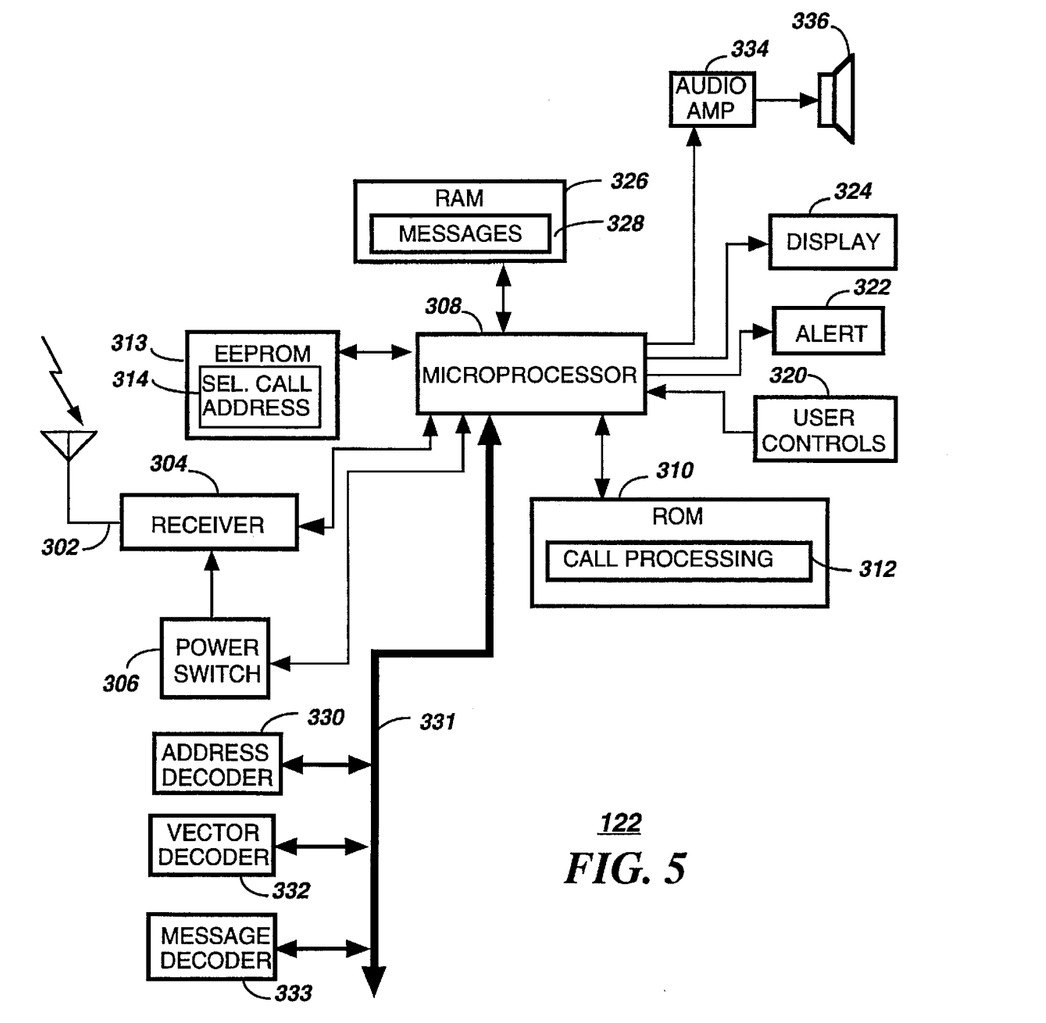

Referring to FIG. 5, an electrical block diagram of a second embodiment of the receiving device 122 in accordance with the present invention. The elements of FIG. 5 include the same elements of FIG. 4 with the exception of the firmware elements, which include the address decoding element 316, the vector decoding element 318 and the message decoding element 319. These elements are replaced with functionally equivalent hardware elements which utilizing conventional logic design techniques well known in the art. The hardware elements comprise an address decoder 330, a vector decoder 332 and a message decoder 333. The hardware elements are coupled to the processor 206 by a data transfer bus 331. The data transfer bus 331 is preferably a conventional bus comprising an address portion, data portion and control portion as is well known by one of ordinary skill in the art. The functions of the hardware elements are equivalent to the firmware descriptions given above for FIG. 4.

Figure 6:
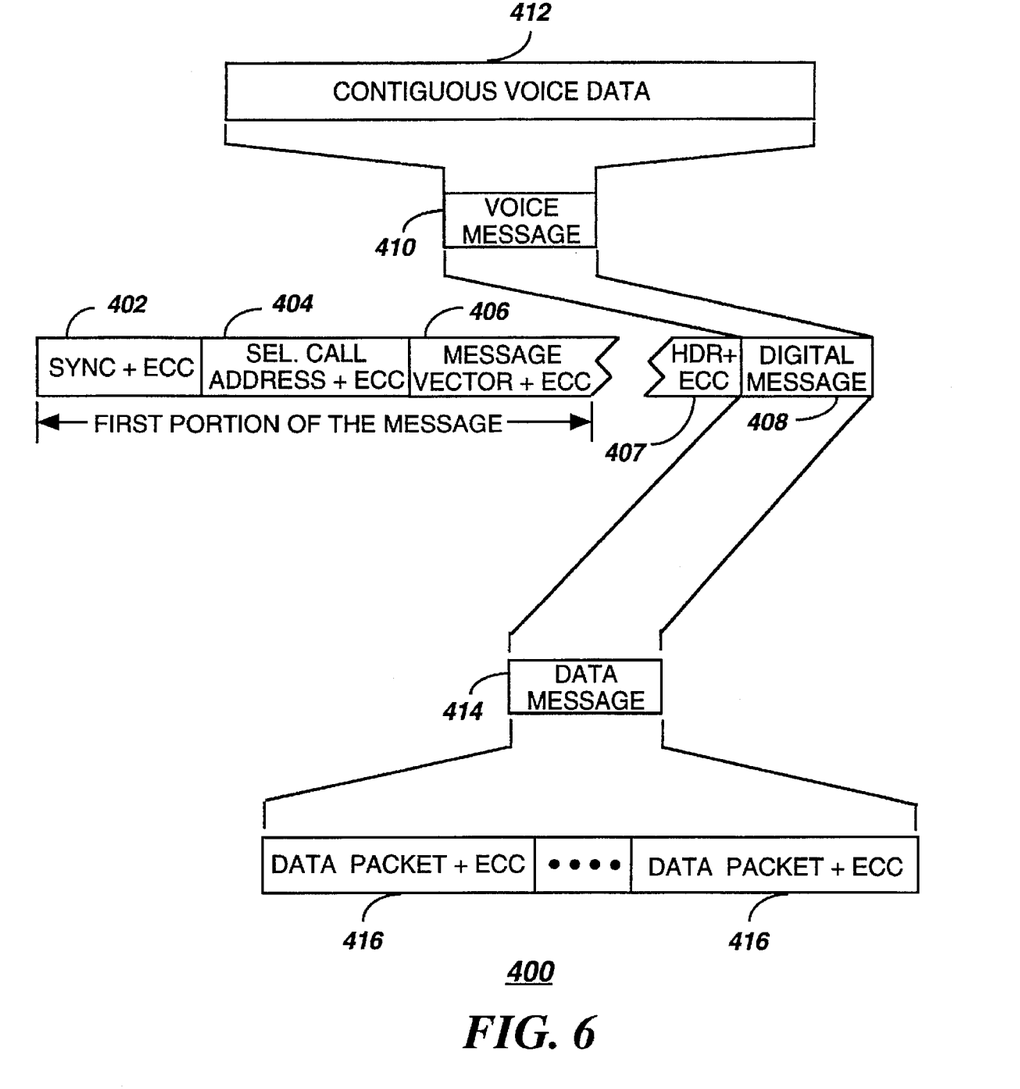
FIGS. 6 and 7 are timing diagrams of first and second embodiments of a communication protocol of the communication system in accordance with the present invention.

FIG. 6 is a timing diagram 400 of a communication protocol of the communication system in accordance with a first embodiment of the present invention. The format of the communication protocol preferably operates on a single carrier frequency utilizing well-known time division duplex (TDD) techniques for sharing the frequency. The elements of the communication protocol comprise in a first portion of the message a sync 402, a selective call address 404 and a message vector 406, and in a second portion of the message a message header 407, and a digital message 408. The sync 402 is preferably encoded using BCH ECC code words and provides the receiving device 122 a means for synchronization utilizing techniques well known in the art. The selective call address 404 also is encoded using BCH ECC code words and identifies the receiving device 122 to which the digital message 408 is intended. The message vector 406 also encoded using BCH ECC code words points in time within the TDD signaling format to the position of the message header 407 and digital message 408 in the second portion of the message. The message header 407, as described above, provides control information for the message fragments. In the second portion of the message the digital message 408 is either a voice message 410 or a data message 414. The voice message 410 represents a digital voice message which has no error correction code added to it. In addition, the voice message 410 comprises a contiguous voice data stream 412 conforming to the data symbol format generated by the voice protocol element 238 described above. The data message 414 represents a digital voice message which uses preferably an error correction code. The data message 414 comprises packets 416 of predetermined bit length encoded using BCH ECC code words. The encoded packets 416 conform to the data symbol format generated by the data protocol element 240 described above.

Figure 7:
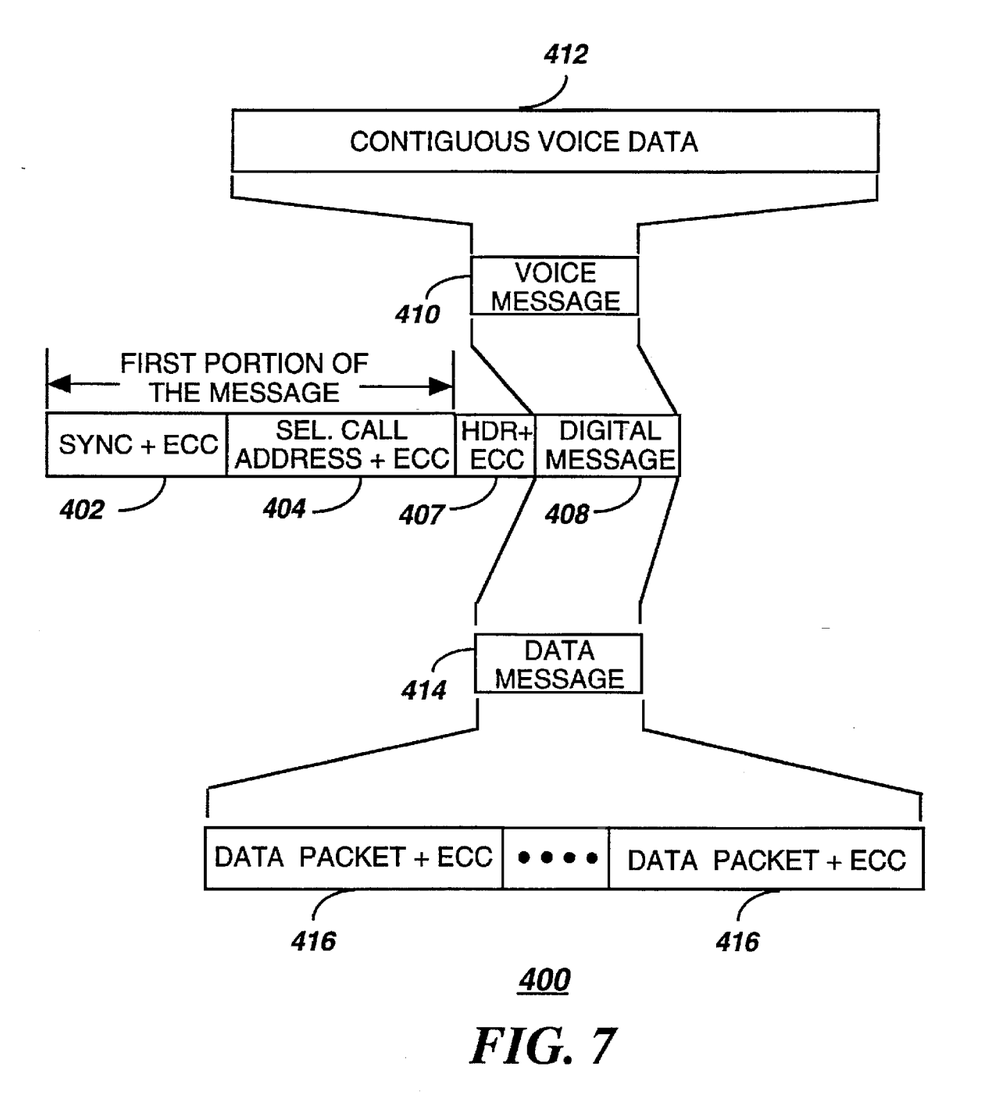

FIG. 7 is a timing diagram of a communication protocol of the communication system in accordance with a first embodiment of the present invention. The communication protocol comprises the same elements as described in FIG. 6 with the exception of the message vector 406. In addition, the first and second portions of the message are contiguous. Moreover, a portion of the selective call address 404 includes the message type which is used by the receiving device 122 to determine the encoding method used on the digital message 408.

Figure 8:
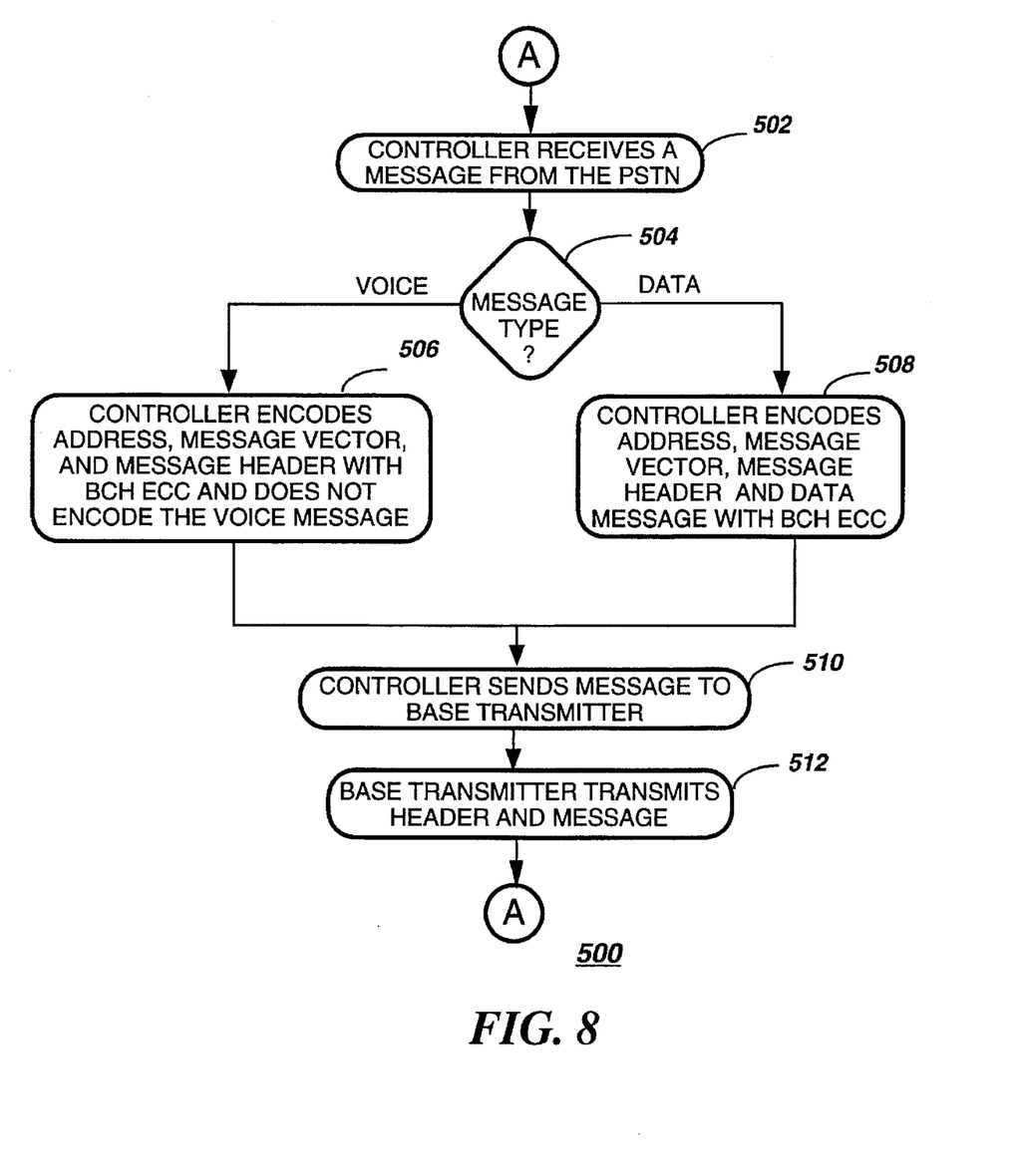
FIG. 8 is a flow chart depicting operation of the controller and transmitting device of the communication system in accordance with the preferred embodiment of the present invention.

Referring to FIG. 8, a flow chart 500 summarizing the operation of the first portion 102 of the communication system in accordance with the preferred embodiment of the present invention begins with step 502 where the controller 112 receives preferably a message comprising digital message information from the PSTN 110. It will be appreciated that, alternatively, as described above, a message can be received from other sources such as the PCMCIA interface. In step 504, the controller 112 determines the message type of the received digital message. The processor 206 invokes the determining element 220 or in an alternate embodiment the determinator 242 to process the digital message and generate a corresponding message type identifying the digital message as either a digital voice message or digital data message. When the processor 206 determines the digital message is a digital voice message, then the processor 206 proceeds to step 506 where the message destined for the receiving device 122 is constructed. The first portion of the message includes the selective call address 404 of the receiving device 122, and the message vector 406 both encoded with BCH ECC code words. The encoded message vector 406 specifies the message type of the message being delivered to the receiving device 122. The second portion of the message includes the encoded BCH ECC message header 407, and the digital message 408 comprising the voice message 410, which requires no error correction or detection codes. Once the voice message 410 has been constructed, the processor 206 calls on the protocol processing element 236, or alternatively the protocol processor 250 to send in step 510 the contiguous stream of data symbols of variable bit length to the transmitting device's 116 transmitter 202. In step 512 the transmitter 202 transmits the message to the receiving device 122.

When the processor 206 determines the digital message is a digital data message, then the processor 206 proceeds to step 508 where the message destined for the receiving device 122 is constructed. The first portion of the message includes the selective call address 404 and the message vector 406 encoded using BCH ECC code words. The second portion of the message includes the message header 407, and the digital message 408 comprising the data message 414, both encoded with BCH ECC. Once the data message 414 has been constructed the processor 206 calls on the protocol processing element 236, or alternatively the protocol processor 250 to send in step 510 the packetized data symbols of predetermined bit length to the transmitting device's 116 transmitter 202. As described above, in step 512 the transmitter 202 transmits the message to the receiving device 122.

As described in FIG. 7, the communication protocol can comprise instead a selective call address 404, and digital message 408 without a message vector 406. In this embodiment, steps 506 and 508 construct the message without a message vector 406.

Figure 9:
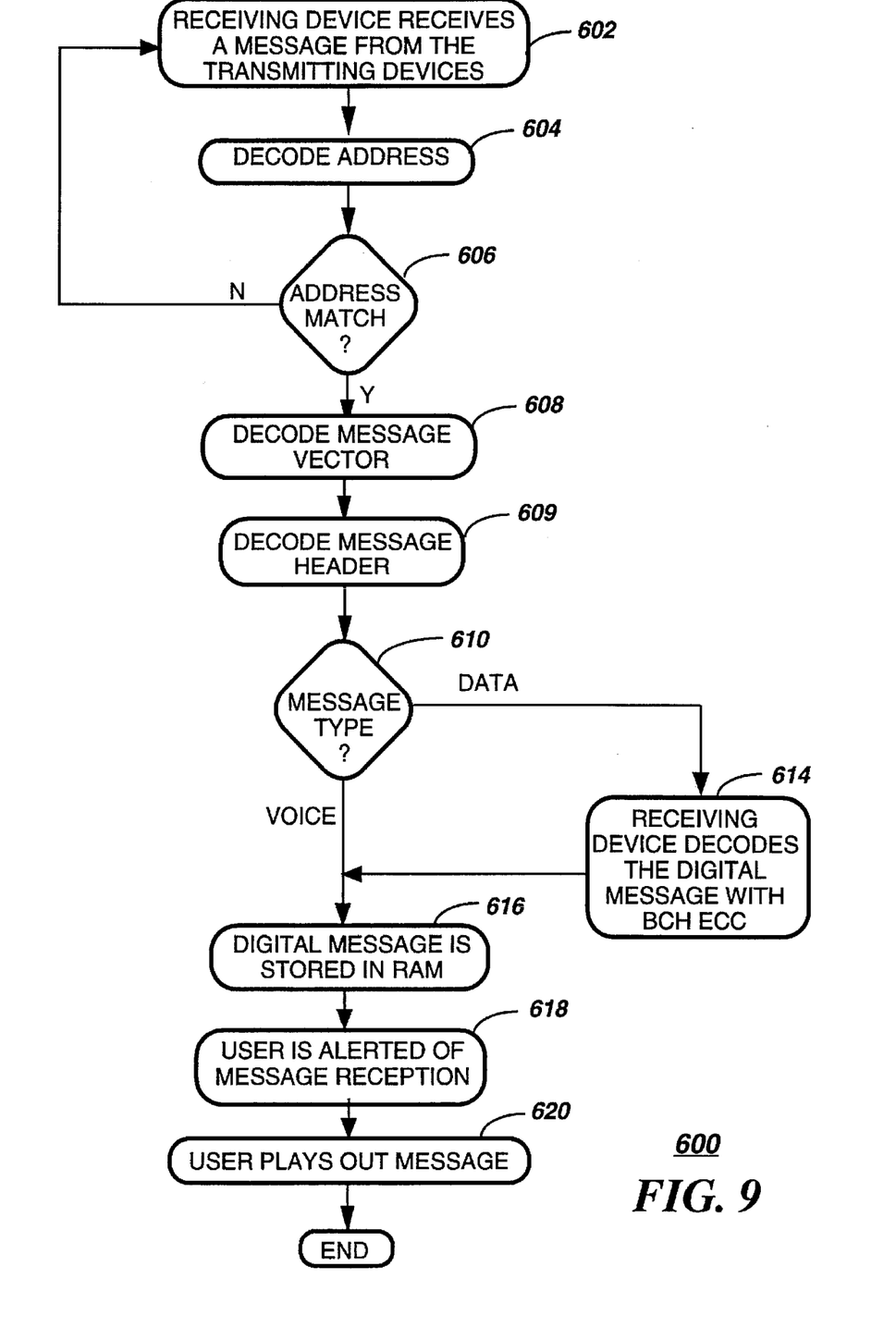
FIG. 9 is a flow chart depicting operation of the receiving device in accordance with the preferred embodiment of the present invention.

Referring to FIG. 9, a flow chart 600 summarizing the operation of the receiving device 122 in accordance with the preferred embodiment of the present invention begins with step 602 where the receiving device 122 receives a message from the transmitting devices 116. The receiving device's 122 microprocessor 308 invokes the call processing element 312 which calls on the address decoding element 316 in step 604 to decode the selective call address 314 encoded in the first portion of the message, and to determine when there is a match with a predetermined address assigned to the receiving device 122. In step 606 the microprocessor 308 compares one or more selective call addresses 314 stored in an EEPROM 313, and when a match is detected, the microprocessor 308 invokes the vector decoding element 318 as shown in step 608 to process the message vector 406 received also in the first portion of the message. When a match is not found, then the microprocessor 308 proceeds to step 602 where the receiving device 122 processes subsequent messages received from the transmitting devices 116. Once the vector decoding element 318 has retrieved the message type from the message vector 406, the microprocessor 308 proceeds to step 609 where the message decoding element 319 removes and decodes the message header 407 from the second portion of the message. In step 610 the message decoding element 319 determines the decoding method to use on the digital message 408 based on the message type received in the message vector 406. When the message type is a digital voice message, then the microprocessor 308 proceeds to step 616 where the digital message 408 is stored directly in the RAM 326 of the microprocessor 308 without further processing. When, however, the digital message 408 is a digital data message, then in step 614 the message decoding element 319 checks the digital message 408 for errors and corrects the errors using the BCH ECC. Once any detectable errors have been corrected, the message decoding element 319 removes the BCH ECC and proceeds to step 616 where the digital message is stored in the RAM 326. In step 618 a call alerting signal is generated by the microprocessor 308 to alert a user that a message has been received. The call alerting signal is directed to a conventional audible or tactile alerting device 322 for generating an audible or tactile call alerting signal. The message 328 stored in the RAM 326 is then accessed by the user in step 620 by the use of appropriate functions provided by the user controls 320. The message 328 is recovered from the RAM 326, and then displayed on a display 324 for alpha-numeric or numeric only messages. For voice messages, however, the voice message is played out by the combination of an audio amplifier 334 and a speaker 336.

It will be appreciated that the receiving device 122 processes the message received from the transmitting devices 116 differently when using the second embodiment of the communication protocol described in FIG. 7. In this case, the selective call address 314 is used for identifying the receiving device 122 and the message type of the digital message 408. Subsequent processing is equivalent to the steps described above.

It will be further appreciated that, alternatively, data messages received by the controller 112 which are known to include an error correction code such as Hamming codes or an error detection code such as a cyclic redundancy check (CRC) can be processed in the same manner as the process described above for voice messages. That is, pre-encoded data messages would be transmitted without the additional overhead of a second tier of error correction or error detection codes. Moreover, an additional message type can be used to identify a pre-encoded data message.

Thus, it should be apparent by now that the present invention provides a method and apparatus in a communication system for selectively encoding digital messages. In particular, the present invention provides a means for efficiently utilizing bandwidth of the communication system by removing the overhead of error correction codes when the digital message is a digital voice message and by employing the error correction code when the message is a digital data message.

What is claimed is:

1. In a communication system comprising one or more transmitting devices and one or more receiving devices, a method for selectively encoding a message, the method comprising the steps of:

in the one or more transmitting devices determining a message type for a digital message to be delivered to the one or more receiving devices, said step of determining comprising the steps of identifying the digital message as a digital voice message and in response thereto generating a first message type identifying the digital voice message, and identifying the digital message as a digital data message and in response thereto generating a second message type identifying the digital data message, encoding in a first portion of the message a selective call address corresponding to the one or more receiving devices, encoding in a second portion of the message the digital message corresponding to the one or more receiving devices, said step of encoding in the second portion comprising the steps of encoding the digital data message utilizing an error correcting code, and encoding the digital voice message without utilizing the error correcting code, and transmitting in the first portion of the message the selective call address and thereafter transmitting in the second portion of the message the digital message; and in the one or more receiving devices receiving the message transmitted by the one or more transmitting devices comprising in the first portion of the message the selective call address and in the second portion of the message the digital message, decoding the selective call address encoded in the first portion of the message to determine when there is a match with a predetermined address assigned to the one or more receiving devices, and thereafter decoding the digital message in the second portion of the message based on the message type which defines an encoding method used to encode the digital message.

2. The method of claim 1, wherein a portion of the selective call address includes the message type.

3. The method of claim 2, wherein decoding the selective call address in the first portion of the message further comprises decoding the portion of the selective call address to determine the encoding method used to encode the digital message.

4. The method of claim 1, wherein the message further includes a message vector in the first portion of the message which specifies a location of the digital message in the second portion of the message.

5. The method of claim 4, wherein a portion of the message vector includes the message type.

6. The method of claim 5, wherein decoding the digital message in the second portion of the message further comprises decoding the portion of the message vector to determine the encoding method used to encode the digital message.

7. The method of claim 1, wherein the second portion of the message comprises:

a contiguous sequence of digital symbols for the digital voice message encoded without utilizing the error correcting code; and a sequence of packets for the digital data message encoded utilizing the error correcting code.

8. The method of claim 7, wherein said second portion of the message further comprises:

a contiguous sequence of digital symbols of variable bit length; and a sequence of packets wherein each packet is of predetermined bit length.

9. A communication system comprising one or more transmitting devices and one or more receiving devices for selectively encoding a message, the communication system comprising:

in the one or more transmitting devices, comprising a processor for directing operation of the one or more transmitting devices, a message interface coupled to the processor for receiving a digital message to be delivered to the one or more receiving devices, a determining element for determining a message type for the digital message, a protocol processing element, responsive to the determining element, comprising a voice protocol element for generating a contiguous sequence of digital symbols when the digital message is a digital voice message, and a data protocol element for generating a sequence of packets when the digital message is a digital data message, an address encoding element for encoding in a first portion of the message a selective call address corresponding to the one or more receiving devices, a message encoding element for encoding in a second portion of the message the digital message corresponding to the one or more receiving devices, wherein said message encoding element comprises a voice encoding element for encoding the digital voice message without utilizing the error correcting code, and a digital data encoding element for encoding the digital data message utilizing the error correcting code, and a transmitter interface coupled to the processor for controlling a transmitter to transmit in the first portion of the message the selective call address and thereafter transmitting in the second portion of the message the digital message; and in the one or more receiving devices, comprising a microprocessor for directing operation of the one or more receiving devices, a receiver for receiving the message transmitted by the one or more transmitting devices comprising in the first portion of the message the selective call address and in the second portion of the message the digital message, an address decoding element for decoding the selective call address encoded in the first portion of the message to determine when there is a match with a predetermined address assigned to the one or more receiving devices, and a message decoding element for decoding the digital message in the second portion of the message based on the message type which defines an encoding method used to encode the digital message.

10. The communication system of claim 9, wherein said message interface comprises a telephone interface coupled to the processor for communicating with a telephone system for receiving the digital message.

11. The communication system of claim 9, wherein said determining element comprises:

a voice identification element identifying the digital message as a digital voice message and in response thereto generating a first message type identifying the digital voice message; and a data identification element identifying the digital message as a digital data message and in response thereto generating a second message type identifying the digital data message.

12. The communication system of claim 11, wherein a portion of the selective call address includes the message type.

13. The communication system of claim 12, wherein said address decoding element decodes the portion of the selective call address to determine the encoding method used to encode the digital message.

14. The communication system of claim 11, wherein the one or more transmitting devices further comprise a vector encoding element for encoding a message vector in the first portion of the message which specifies a location of the digital message in the second portion of the message.

15. The communication system of claim 14, wherein a portion of the message vector includes the message type.

16. The communication system of claim 15, wherein said message decoding element comprises decoding the portion of the message vector to determine the encoding method used to encode the digital message.

17. The communication system of claim 9, wherein said voice protocol element generates a contiguous sequence of digital symbols of variable bit length.

18. The communication system of claim 17, wherein said data protocol element generates a sequence of packets wherein each packet is of predetermined bit length.

19. A communication system comprising one or more transmitting devices and one or more receiving devices for selectively encoding a message, the communication system comprising:

in the one or more transmitting devices, comprising
a processor for directing operations of the one or more transmitting devices,
a message interface coupled to the processor for receiving a digital message to be delivered to the one or more receiving devices,
a determining element for determining a message type for the digital message,
a protocol processing element, responsive to the determining element, comprising
a voice protocol element for generating a contiguous sequence of digital symbols when the digital message is a digital voice message, and
a data protocol element for generating a sequence of packets when the digital message is a digital data message,
an address encoder for encoding in a first portion of the message a selective call address corresponding to the one or more receiving devices,
a message encoder for encoding in a second portion of the message the digital message corresponding to the one or more receiving devices wherein said message encoder comprises
a voice encoding element for encoding the digital voice message without utilizing the error correcting code, and
a digital data encoding element for encoding the digital data message utilizing the error correcting code, and
a transmitter interface coupled to the processor for controlling a transmitter to transmit in the first portion of the message the selective call address and thereafter transmitting in the second portion of the message the digital message; and in the one or more receiving devices, comprising
a microprocessor for directing operation of the one or more receiving devices,
a receiver for receiving the message transmitted by the one or more transmitting devices comprising in the first portion of the message the selective call address and in the second portion of the message the digital message,
an address decoder for decoding the selective call address encoded in the first portion of the message to determine when there is a match with a predetermined address assigned to the one or more receiving devices, and
a message decoder for decoding the digital message in the second portion of the message based on the message type which defines an encoding method used to encode the digital message.

* * * * *